(12) United States Patent
Vassiliou (10) Patent No.: US 6,250,864 B1
(45) Date of Patent: Jun. 26, 2001

(54) FASTENER WITH SINGLE-LAYERED HEAD

(75) Inventor: Eustathios Vassiliou, Newark, DE (US)

(73) Assignee: WTPA, Incorporated, Newark, DE (US)

( * ) Notice: Subject to any disclaimer, the term of this patent is extended or adjusted under 35 U.S.C. 154(b) by 0 days.

(21) Appl. No.: 09/699,759

(22) Filed: Oct. 30, 2000

Related U.S. Application Data (60) Provisional application No. 60/179,624, filed on Feb. 2, 2000.

(51) Int. Cl.[7] .............................. F16B 13/04; F16B 13/06
(52) U.S. Cl. .............................. 411/30; 411/55; 411/60.2; 411/64
(58) Field of Search .................................. 411/30, 31, 55, 411/60.2, 61, 63, 64, 542

(56) References Cited

U.S. PATENT DOCUMENTS

| | | | |
|---|---|---|---|
| 4,500,238 | 2/1985 | Vassiliou | 411/30 |
| 4,765,788 | 8/1988 | Nowak et al. | 411/61 |
| 4,874,277 | 10/1989 | Nowak et al. | 411/61 |
| 4,941,340 | 7/1990 | Nowak et al. | 72/379.2 |
| 5,100,273 | 3/1992 | Vassiliou | 411/60 |
| 5,443,343 | * 8/1995 | Mutz et al. | 411/61 X |
| 5,447,005 | 9/1995 | Giannuzzi | 411/30 |
| 5,725,343 | 3/1998 | Smith | 411/55 |

* cited by examiner

Primary Examiner—Neill Wilson
(74) Attorney, Agent, or Firm—E. Vassiliou (57) ABSTRACT

This invention relates to sheet metal reversed L-shaped segments, two of which may be assembled to form a T-shaped structure or fastener having a single layered head. The single-layered head has a hole engageable to an expanding member, such as a screw for example. The engageable hole is formed by two half holes, each half hole belonging to each L-shaped segment. Further, the fastener has legs, which expand upon insertion of the screw into the engageable hole. The T-shaped structure is adaptable to be securely locked in a slot of a metal sheet. This strong locking is realized by two sets of levers acting in opposite directions, and having as common fulcrum the region at the edges of the slot. One set of levers is formed by the action of the screw on the two half holes which form the engageable hole, while the other set of levers is formed by the action of the screw on the legs of the two L-shaped segments.

54 Claims, 3 Drawing Sheets

FIG. 11

FASTENER WITH SINGLE-LAYERED HEAD

RELATED APPLICATIONS

This application claims priority of provisional patent application No. 60/179,624, filed on Feb. 2, 2000, which is incorporated herein by reference in its entirety.

FIELD OF THE INVENTION

This invention pertains fasteners, and more particularly fasteners which have expandable legs and which attach one object to another object.

BACKGROUND OF THE INVENTION

In the original conventional technology of fasteners employed to securely attach one object to another, such as for example one part to another in the case of an automobile or an appliance, has utilized a nut on one of the two objects, usually welded or glued to the back of said object, and a bolt passing through a hole on the second object in a manner to be engaged by the nut, thereby securing the two objects together.

This arrangement presents many problems, among which, one of the most important is that in the case that one object is hollow, the nut has to be in place at the back of the hollow object before assembling the two objects together. If for any reason the nut is misplaced, and/or if it becomes desirable to introduce a new fastening connection between the two objects, the task of achieving such connection becomes very difficult if not impossible for all practical purposes.

The so-called "quick nuts" have also been used to connect two objects. In addition, vibration during the operation of a device, such as an automobile or appliance for example, containing the two objects results very often in loosening of the bolt or "quick nut" and in either full disassembling of the objects from each other, or in a vibration noise which is most annoying and often of unacceptable levels. Further, such connections are not water-resistant and water may be easily penetrate the connection point and be transferred from one side of one or both objects to the other side.

Recently, fasteners of the type described in U.S. Pat. No. 4,500,238 (Vassiliou) have been utilized to reduce considerably the potential of bolt or screw loosening and vibration. They have also eliminated the problem of having to place one member of the fastener at the back portion of the hollow object. These fasteners are placed through a slot from the front part of the hollow object. An expanding member, being usually a bolt or a screw, supports the second object by forcing the legs of the fastener (as described for example in U.S. Pat. No. 4,500,238) to open or expand, thereby securing the two objects together. The legs of the fasteners are supported by a double-layered head having an upper side and a lower side joined by side bents. The fasteners of this type have greatly improved the prevailing torque, as well as the pulling force of the system. Prevailing torque is the torque required to render a screw loose. Pulling force is the pulling force applied on the screw to the point of failure, which usually occurs at the bents.

One drawback of the above fasteners is that the two layers or sides of the head separate the two objects to be connected together by a distance equal to the head thickness, unless there is a recess in at least one of the objects to nest the head. This situation is worsened by the fact that the bents joining the two layers or sides of the head should to have a curvature as high as possible in order to increase the pulling force and prevent premature failure. Thus, in many occasions it is desirable to have fasteners having a single-layered head in order to minimize the thickness of said head.

It is one object of this invention to provide such fasteners having a substantially single-layered head.

SUMMARY OF THE INVENTION

This invention pertains an L-shaped segment which can be combined with a second L-shaped segment to form a fastener having a T-shaped structure the T-shaped structure comprising:

a substantially flat head, the substantially flat head having a hole engageable to an expansion member, the substantially flat head comprising a first single-layer head portion being part of the first L-shaped segment and a second single-layer head portion being part of the second L-shaped segment, the first single-layer head portion having a first inward extension, and the second single-layer head portion having a second inward extension;

a double-layer neck portion having an opening comprising a funnel configuration, and extending from the substantially flat head in a direction substantially perpendicular to said substantially flat head; and a double-layer leg portion extending from the double-layer neck portion in a direction substantially parallel to said double-layer neck portion.

The present invention also pertains a sheet-metal fastener comprising an assembly of a first L-shaped segment and a second L-shaped segment combined together to form a T-shaped structure the T-shaped structure comprising a substantially flat head, the substantially flat head having a hole engageable to an expansion member, the substantially flat head comprising a first single-layer head portion being part of the first L-shaped segment and a second single-layer head portion being part of the second L-shaped segment, the first single-layer head portion having a first inward extension, and the second single-layer head portion having a second inward extension;

a double-layer neck portion having an opening comprising a funnel configuration, and extending from the substantially flat head in a direction substantially perpendicular to said substantially flat head; and a double-layer leg portion extending from the double-layer neck portion in a direction substantially parallel to said double-layer neck portion.

The present invention is also related to a vehicle comprising two elements connected with a sheet-metal fastener, the vehicle comprising an assembly of a first L-shaped segment and a second L-shaped segment combined together to form a T-shaped structure the T-shaped structure comprising a substantially flat head, the substantially flat head having a hole engageable to an expansion member, the substantially flat head comprising a first single-layer head portion being part of the first L-shaped segment and a second single-layer head portion being part of the second L-shaped segment, the first single-layer head portion having a first inward extension, and the second single-layer head portion having a second inward extension;

a double-layer neck portion having an opening comprising a funnel configuration, and extending from the substantially flat head in a direction substantially perpendicular to said substantially flat head; and a double-layer leg portion extending from the double-layer neck portion in a direction substantially parallel to said double-layer neck portion.

At least one of the first L-shaped segment and the second L-shaped segment may comprise at least one outwardly disposed barb.

At least one of the first inward extension and the second inward extension may be adequately wide to overlap the other. Thus, the substantially flat head may be fully single-layered before insertion of the expanding member through the engageable hole, or after insertion of the expanding member through the engageable hole. However, one of the first inward extension and the second inward extension may overlap the other even after the insertion of the expanding member through the engageable hole.

The sheet-metal fastener may further comprise an additional engagement section, for further engaging the expanding member, at a part of the fastener under the head.

The sheet-metal fastener may also comprise an elastic body molded in the vicinity of the head and at least under the head.

The engageable hole at the head of the fastener may have a shape selected from a group consisting substantially round and substantially oblong.

The expanding member is preferably a screw.

The engageable hole is preferably an at least partial impression corresponding to the pitch of a fastening member, such as a screw for example. In some occasions is critical that this impression is extended downwardly with regard to the substantially flat head, and in some occasions is critical that this impression is extended upwardly with regard to the substantially flat head.

The first L-shaped segment may be physically connected to the second L-shaped segment. This secondary connection may be made through a side tab. The side tab may be integral part of one or both segments. Alternatively, the physical connection may be a temporary frictional connection.

In the case that the first L-shaped segment and the second L-shaped segment are not integrally connected, when a pre-assembled fastener (as an assembly of a first L-shaped segment and the second L-shaped segment) is desired, it is highly desirable that during the manufacture of the fastener, a temporary union (integrally connecting the first L-shaped segment and the second L-shaped segment) is present, so that the part may be folded, and the two L-shaped segments be connected with the secondary connection. The union may then be cut off.

Examples of frictional engagement are described in U.S. Pat. Nos. 4,765,788, 4,874,277, and 4,941,340, all three of which are incorporated herein by reference.

As aforementioned, the first engageable hole may have a substantially round or a substantially oblong shape. Fasteners having a round hole are well known to the art. Fasteners having a hole with an oblong shape are described in the provisional application Ser. No. 60/171,544, filed on Dec. 14, 1999, and provisional application Ser. No. 60/234,385, filed on Sep. 20, 2000, both of which provisional applications are incorporated herein by reference.

When water-proofing, and/or gas-proofing are desired for a particular application, and/or vibration noises are to be prevented, an elastic body is preferably integrally molded at least at the lower side of the substantially flat head portion. Such elastic bodies are for example disclosed in U.S. Pat. No. 5,725,343 (Smith), which is incorporated herein by reference, in the provisional application of Kanubhai Manibhai Patel, Michael Walter Smith and Edward John Smith, titled "High Performance Sealing Fastener", having a Ser. No. 60/170,112, and filed on Dec. 10, 1999, which provisional application is incorporated herein by reference, and in patent application Ser. No. 09/561,505, filed on Apr. 28, 2000, which Patent Application is incorporated herein by reference.

The portion of the fastener under the head may comprise an element engageable to the expanding member. Such engageable elements are described in provisional application No. 60/167,080 (Vassiliou), filed Nov. 23, 1999, No. 60/169,477 (Vassiliou), filed Dec. 7, 1999, No. 60/170,611 (Vassiliou), filed on Dec. 14, 1999, and No. 60/179,384 (Vassiliou), filed on Feb. 2, 2000, all four of which provisional applications are incorporated herein by reference.

BRIEF DESCRIPTION OF THE DRAWING

The reader's understanding of this invention will be enhanced by reference to the following detailed description taken in combination with the drawing figures, wherein.

DETAILED DESCRIPTION OF THE INVENTION

This invention is related to expanding fasteners which can secure two or more objects together. An example is two automobile parts, such as a plastic panel and a metal sheet having a slot, for example, secured together. Further, this invention pertains a first L-shaped segment which may be assembled with a second L-shaped segment to form a T-shaped fastener. The T-shaped fastener may be formed by inserting the two L-shaped segments individually or pre-assembled. Also, the invention pertains vehicles comprising parts connected with the novel L-shaped segments and the fasteners described herein.

Figure 1:
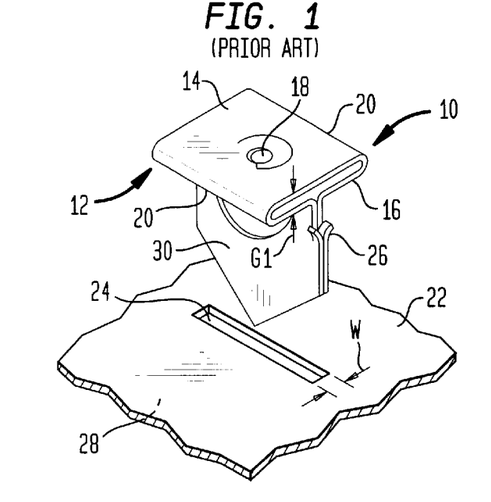
FIG. 1 is a perspective view of a prior art fastener, having a double-layered head, and a sheet with a slot on which sheet the fastener is intended to fasten another object.

Referring now to FIG. 1, there is depicted a conventional sheet-metal fastener 10, similar to the fasteners described in U.S. Pat. No. 4,500,238, comprising a substantially flat head portion 12. The substantially flat head portion 12 has an upper side 14, and a lower side 16. The upper side 14 has an engageable hole 18.

FIG. 1 also depicts a sheet, such as a metal sheet 22 for example, comprising a slot 24, which slot 24 has a width W, and other dimensions commensurate to the size of the fastener 10.

In operation of this system, the fastener 10 is inserted into the slot 24, and is usually held in position by barbs 26, which barbs 26 engage on the back side 28 of metal sheet 22, in the vicinity of the slot 24. In sequence, another object, such as a plastic panel 23 (better shown in FIG. 1a) for example, having a panel hole 25 is placed on top of the fastener 10 so that the axis of the panel hole and the axis of the engageable hole 18 substantially coincide. An expanding member, such as a screw 27 for example, is finally inserted through the panel hole, is engaged on the engageable hole 18, and expands the legs 30 of the fastener 10. In this manner, the plastic panel 23 is secured on the metal sheet 22 by the expanded legs 30 under the metal sheet 22, and by the screw 27, which engages on the upper side 14 of the head 12. The barbs 26 are not shown in FIG. 1a for purposes of clarity.

Figure 1A:
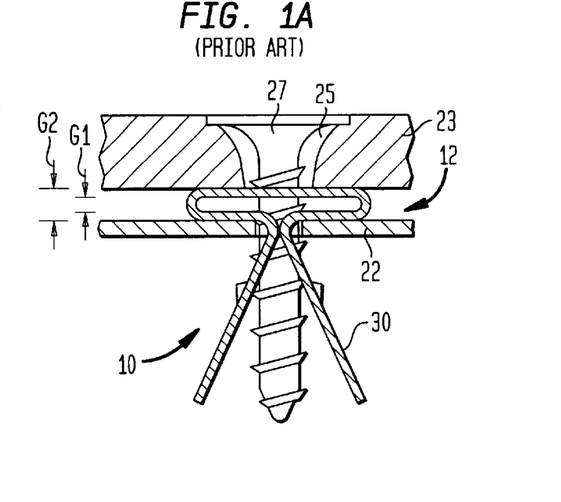
FIG. 1a is a fragmental cross-sectional view of the prior art fastener of FIG. 1, which fastener has secured a panel onto the sheet.

As shown in FIGS. 1 and 1a, the upper side 14 and the lower side 16 of the head 12 may be separated by a gap G1, or they may be substantially in contact (not shown for purposes of clarity) with each other, depending on the application. The upper side 14 is connected to the lower side 16 through side bents 20.

The larger the gap G1 the larger the radius of curvature of the two bents 20, and therefore, the higher the pulling force which is needed to break the hardened fastener at the bent regions and separate the plastic panel 23 from the metal sheet 22.

With this type of fastener, the plastic panel 23 is separated from the metal sheet 22 by a rather large gap G2, which equals the total thickness of the head 12 of the fastener 10.

This is not objectionable in many circumstances. However, there are many occasions when there are space restrictions and a relatively bulky configuration of the head 12 is undesirable, even in the case that the upper side 14 and the lower side 16 are substantially in contact.

The present invention solves satisfactorily this problem by providing a fastener of a fully or substantially single-layered head, which minimizes the gap G2.

Figure 2:
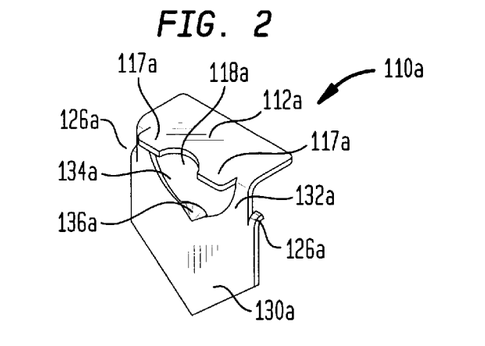
FIG. 2 is a perspective view of a first L-shaped segment which can be combined with a second L-shaped segment to form a T-shaped structure according to the instant invention.

According to a preferred embodiment of this invention, there is provided a first L-shaped (reversed L) segment 110a as better shown in FIG. 2. The first L-shaped segment 110a comprises a first single-layer head portion 112a, which head portion 112a has a first inward extension 117a, and a first half hole 118a.

The first L-shaped segment 110a further comprises a first neck portion 132a, which neck portion has an opening 134a. The first inward extension 117a is formed from the creation of the opening 134a in the manufacture of the L-shaped segment 110a. In other words the first inward extension 117a was part of the sheet metal where the opening is located after the manufacture of the L-shaped segment 110a. The opening 134a comprises a first half funnel configuration 136a opposite the first inward extension 117a.

The first neck portion 132a extends from the first single-layer head portion 112a in a direction substantially perpendicular to said first single-layer head portion 112a. The first L-shaped segment 110a also comprises a first leg portion 130a, which extends from the first neck portion 132a in a direction substantially parallel to said first neck portion 132a. Outwardly disposed barbs 126a are also part of the first L-shaped segment 110a.

As already implemented, all numbers corresponding to miscellaneous elements of the first L-shaped segment 110a are accompanied by the letter "a" to signify that they are elements of the first L-shaped segment 110a. Similarly all numbers corresponding to miscellaneous elements of a second L-shaped segment 110b (not shown in FIG. 1, but shown in FIG. 4 as discussed later) will be accompanied by the letter "b" to signify that they are elements of the second L-shaped segment 110b. Finally, numbers which are not accompanied by a letter (for example 110) designate respective elements of an assembled fastener, which fastener comprises collectively both the first L-shaped segment 110a and the second L-shaped segment 110b.

In this particular preferred embodiment, the second L-shaped segment 110b is actually the same segment as the first L-shaped segment 110a, preferably except for the half holes, which are a continuation of each other, when the two segments are assembled, in a manner to form a substantially full hole which is engageable to an expanding member, such as a screw for example. In other words, the perimeter of the full hole has a circular inclination commensurate to the thread and pitch of the screw.

When the two L-shaped segments 110a and 110b are assembled, form a T-shaped structure or fastener 110. Such a T-shaped structure is similar to the one shown in the embodiment of FIG. 4, with the difference that in FIG. 4, the barbs 126a have been replaced by side tabs 138a, which side tabs 138a are used to hold the two L-shaped segments 110a and 110b together. This is not necessary, however, because the two L-shaped segments are eventually held together by the slot 124 of the metal sheet 122.

Figure 4:
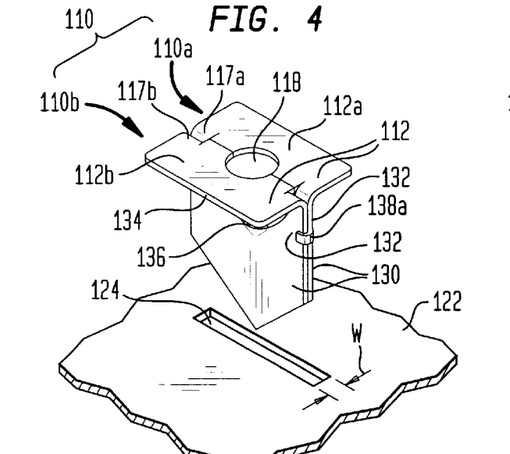
FIG. 4 is a perspective view of a fastener comprising an assembly of a first L-shaped segment combined with a second L-shaped segment thus forming a T-shaped structure according to the instant invention.

Thus, the T-shaped structure comprises a substantially flat head 112 having a hole 118 engageable to an expansion member (not shown in FIG. 4). The substantially flat head 112 comprises a first single-layer head portion 112a, which is part of the first L-shaped segment 110a and a second single-layer head portion 112b, which is part of the second L-shaped segment 110b. The first single-layer head portion 112a comprises a first inward extension 117a, and the second single-layer head portion 112 comprises a second inward extension 117b.

The hole 118 is preferably an at least partial impression corresponding to the pitch of the fastening member, such as a screw for example. In some occasions is critical that this impression is extended downwardly with regard to the substantially flat head 112, and in some occasions is critical that this impression is extended upwardly with regard to the substantially flat head 112.

The T-shaped structure 110 also comprises a double-layer neck portion 132 having an opening 134, which opening 134 comprises a funnel configuration 136. The double-layer neck portion 132 extends from the substantially flat head 112 in a direction substantially perpendicular to said substantially flat head 112.

The T-shaped structure 110 further comprises a double-layer leg portion 130 extending from the double-layer neck portion 132 in a direction substantially parallel to said double-layer neck portion 132.

Figure 6:
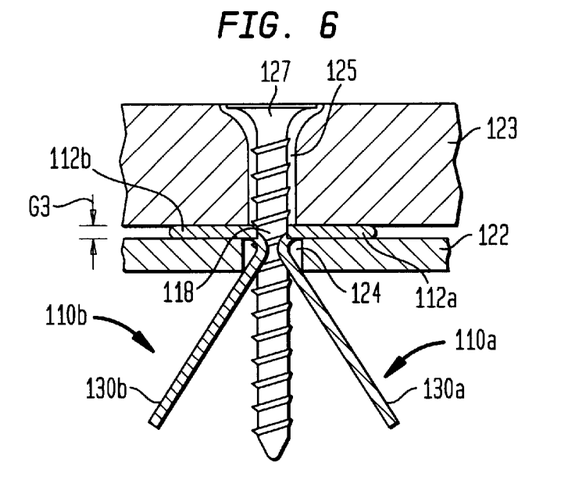
FIG. 6 is a cross-sectional side view of a fastener illustrated in FIG. 4 or 5 connecting two objects or panels after the legs of the fastener have been expanded by a screw.

In operation of this embodiment, better illustrated in FIG. 6, the first L-shaped structure 110a and the second L-shaped structure 110b are inserted into the slot 124 (which slot 124 has a width W and other dimensions commensurate to the finally formed fastener) of the metal sheet 122 in a manner to form a T-shaped fastener. The panel 123 is then placed on top, in a manner that the panel hole 125 is on top of the hole 118 of the head 112 (112a and 112b). In sequence, the screw 127 is fully inserted (threaded) through the hole 118 causing the legs 130 (130a and 130b) to expand.

In this position, the T-shaped structure or fastener 110 is securely locked in the slot 124 of the metal sheet 122. This strong locking is realized by two sets of levers acting in opposite directions, and having as common fulcrum the region at the edges of the slot 124. One set of levers is formed by the action of the screw 127 on the two half holes which form the engageable hole 118, while the other set of levers (or opposing levers) is formed by the action of the screw on the legs 130 of the two L-shaped segments 110.

The screw 127 further securely holds the panel 123 on the fastener 110, as being engaged to the engageable hole 118. Thus, the panel 123 has been connected securely on metal sheet 122 presenting a minimal gap G3, as compared to gap G2 (see FIG. 1a), when a conventional fastener is employed. In FIG. 6, the funnel 136, barbs 126a, and other secondary elements are not shown for purposes of clarity.

It is worth noting that the two L-shaped segments may be inserted into the slot 124 either individually one after the other, or as an assembly.

In the embodiment of FIG. 4, as also mentioned earlier, there is included one or more side tabs 138a which are used to hold the two L-shaped segments together before their insertion into the slot 124.

The operation of this embodiment is substantially the same as in the operation of the previous embodiment.

Figure 3:
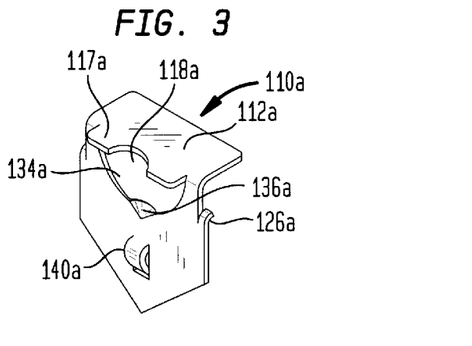
FIG. 3 is a perspective view of another first L-shaped segment which can be combined with a second L-shaped segment to form a T-shaped structure according to the instant invention.
Figure 5:
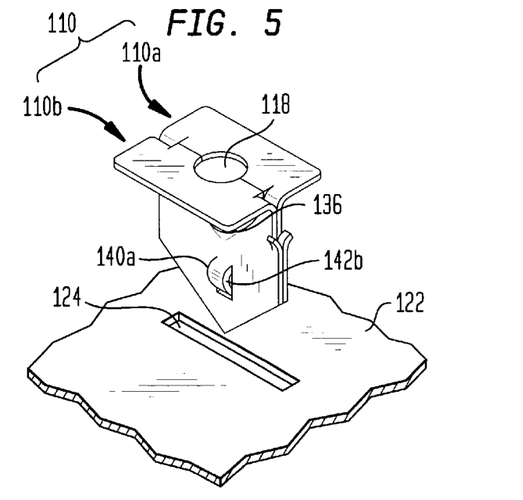
FIG. 5 is a perspective view of another fastener comprising an assembly of a first L-shaped segment combined with a second L-shaped segment thus forming a T-shaped structure according to the instant invention.

In another embodiment, better shown in FIGS. 3 and 5, there is provided a first L-shaped segment 110a, which is similar to the first L-shaped segment of the embodiment shown in FIG. 2, with the difference that the L-shaped segment 110a of FIG. 3 has a frictional tab 140a. The second L-shaped 110b has a frictional slot 142b, within which the frictional tab 140a nests, when the T-shaped structure is formed, providing a frictional engagement. As aforementioned, frictional engagement examples are given in U.S. Pat. Nos. 4,765,788, 4,874,277, and 4,941,340, all three of which are incorporated herein by reference.

The operation of this embodiment is substantially the same as the operation of the previous embodiments, with the difference that when the screw 127 expands the legs 130, temporary connection of said legs 130 (130a and 130b) through the frictional tab 140a is broken.

Figure 7:
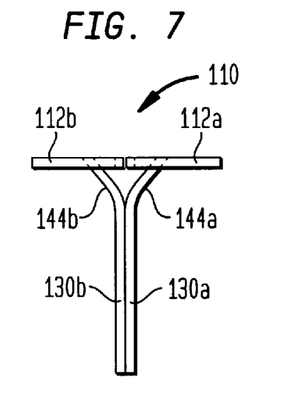
FIG. 7 is a side view of a fastener comprising an assembly of a first L-shaped segment combined with a second L-shaped segment thus forming a T-shaped structure according to the instant invention, wherein the head is fully single-layered. Funnel and/or barbs and/or secondary connections are not shown for purposes of clarity.
Figure 8:
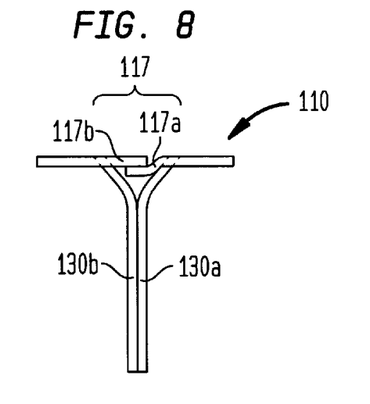
FIG. 8 is a side view of a fastener comprising an assembly of a first L-shaped segment combined with a second L-shaped segment thus forming a T-shaped structure according to the instant invention, wherein the head is substantially single-layered. Funnel and/or barbs and/or secondary connections are not shown for purposes of clarity.
Figure 9:
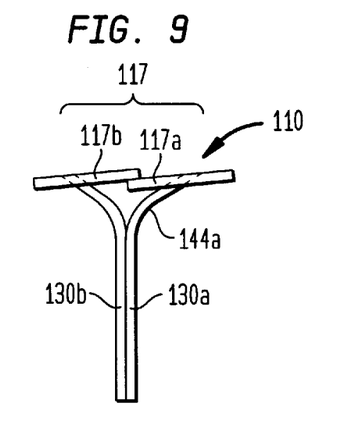
FIG. 9 is a side view of a fastener comprising an assembly of a first L-shaped segment combined with a second L-shaped segment thus forming a T-shaped structure according to the instant invention, wherein the head may be either fully or substantially single-layered, depending on the degree of overlap and the size of the engageable hole before insertion of the expanding member into said engageable hole. Funnel and/or barbs and/or secondary connections are not shown for purposes of clarity.

The head 112 (112a+112b) of the sheet-metal fastener 110 may be fully single-layered as better illustrated in FIG. 7, or substantially single-layered, as better illustrated in FIGS. 8 and 9, wherein the first and second inward extensions 117 overlap each other. In FIGS. 8 and 9, the first inward extensions 117a is shown to be under the second inward extension 117b. It is evident, however that the first inward extension 117a may be over the second inward extension 117b equally well.

In the case of overlapping inward extensions, said extensions may continue to overlap each other after the insertion of the expanding member or screw 127, or they may cease to overlap each other, depending on the width of the inward extensions and size of the screw, among other parameters.

The width of the inward extensions 117 depends on the radius of curvature of the central bent 144. The larger the radius the larger the width may be or should be. This width may be substantially zero (without the exclusion of larger than zero) if the radius of curvature of the central bents 144 is substantially zero, or about as long as the length of the opening 134 for larger radii of curvature.

In FIGS. 7, 8, and 9, the funnel 136, barbs 126a, and other secondary elements are not shown for purposes of clarity.

Figure 10:
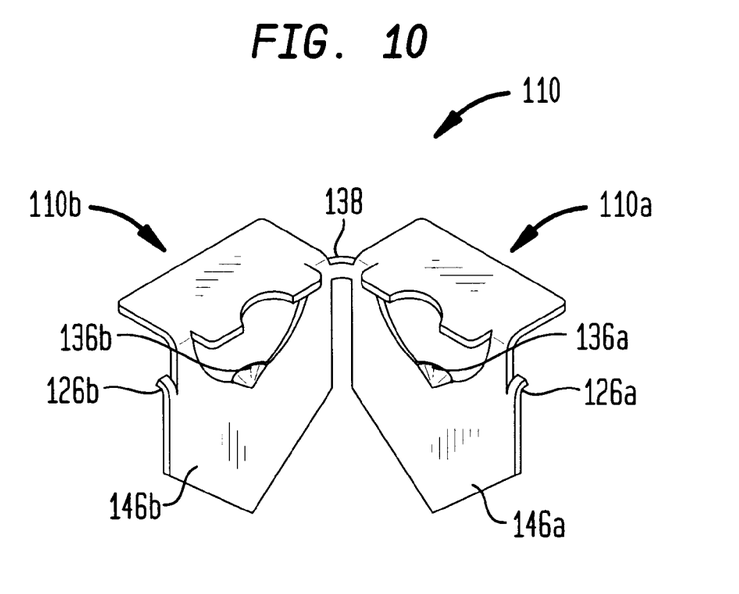
FIG. 10 is a perspective view of a first L-shaped segment and a second L-shaped segment connected integrally together through a common side tab, so that when are folded around the common side tab and toward each other, form a T-shaped fastener having a single-layered head according to another preferred embodiment of the instant invention.

FIG. 10 illustrates a sheet-metal fastener according to the instant invention, wherein the side tab 138 is common to both the first L-shaped segment 110a and the second L-shaped segment 110b, and integrally connects the two segments together.

The two L-shaped segments 110a and 110b of the fastener 110 are shown in a position before folding said segments around the side tab 138 for purposes of illustration.

Since the T-shaped assembly 110 of the two L-shaped segments 110a and 110b is finally hardened, it attains spring properties. Another embodiment of the instant invention takes advantage of this property, by not folding the L-shaped segments to completeness, but allowing the unconnected sides 146a and 146b to be separated by a distance higher than the width W of the slot 124 (see FIG. 4 for example). In this manner, when the fastener is inserted into the slot 124, in the operation of the system, the fastener or T-shaped assembly 110 is held in place, even without the need of the barbs 126a. The distance between the unconnected sides 146a and 146b preferably should not be larger than that which might cause breakage of the side tab 138 when the unconnected sides 146a and 146b are pushed toward each other in order to allow the fastener 110 to be inserted into the slot 124.

As aforementioned, the sheet-metal fastener of the present invention may further comprise an additional engagement section, for further engaging the expanding member, at a portion of the fastener under the head. Each L-shaped segment may have engagement elements which are complementary to engagement elements of the other L-shaped segment in a manner to form complete engagement elements during operation, when the two L-shaped segments are in an assembly form. Examples of such complete engagements are described in provisional application No. 60/167,080 (Vassiliou), filed Nov. 23, 1999, No. 60/169,477 (Vassiliou), filed Dec. 7, 1999, and No. 60/170,611, filed on Dec. 14, 1999, all three of which provisional applications are incorporated herein by reference.

The engageable hole at the head of the fastener or T-shaped assembly of the instant invention may have a shape preferably selected from a group consisting of substantially round and substantially oblong. Fasteners having a round hole are well known to the art. Fasteners having a hole with an oblong shape are described in the provisional application of Joseph W. Lowry and Eustathios Vassiliou, titled "Extensive Engagement Fastener", Ser. No. 60/171,544, filed on Dec. 14,1999, which provisional application is incorporated herein by reference.

Figure 11:
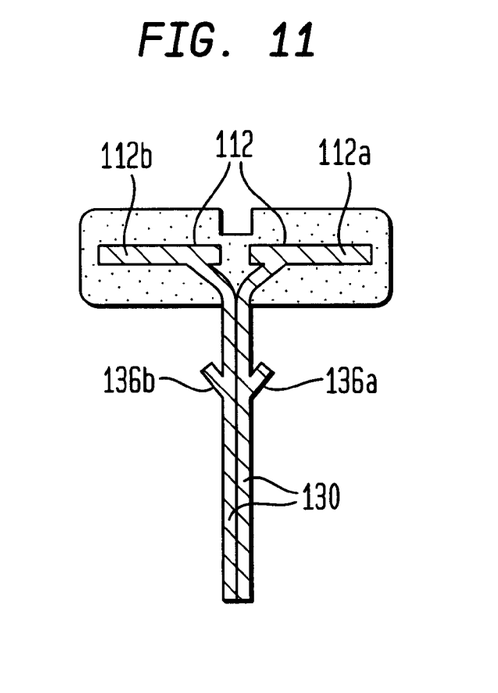
FIG. 11 is a side view of a fastener comprising an assembly of a first L-shaped segment combined with a second L-shaped segment thus forming a T-shaped structure according to the instant invention, further comprising an elastic body molded in the vicinity of the head.

The sheet-metal fastener or assembly of the present invention may also comprise an elastic body 7 molded in the vicinity of the head 112 and at least under the head, as better shown as an example in FIG. 11. Thus, when water-proofing, and/or gas-proofing are desired for a particular application, and/or vibration noises are to be prevented, an elastic body is preferably integrally molded at least at the lower side of the head. Such elastic bodies are for example disclosed in U.S. Pat. No. 5,725,343 (Smith), and in the provisional application of Kanubhai Manibhai Patel, Michael Walter Smith and Edward John Smith, titled "High Performance Sealing Fastener", having a Ser. No. 60/170,112, and filed on Dec. 10, 1999, and which provisional application is incorporated herein by reference.

As aforementioned, in the case that the first L-shaped segment and the second L-shaped segment are not integrally connected, when a pre-assembled fastener (as an assembly of a first L-shaped segment and the second L-shaped segment) is desired, it is highly desirable that during the manufacture of the fastener, a temporary union (integrally connecting the first L-shaped segment and the second L-shaped segment) is present, so that the part may be folded, and the two L-shaped segments be connected with the secondary connection. The union is then cut off.

One or more of the above embodiments may be exercised simultaneously.

The embodiments described hereinabove serve illustration purposes only regarding this invention, which should only be bound by the claims.

Any explanations given are speculative and should not restrict the scope of the claims.

What is claimed is:

1. A first L-shaped segment which can be combined with a second L-shaped segment to form a fastener having a T-shaped structure, the T-shaped structure comprising
    a substantially flat head, the substantially flat head having a hole engageable to an expansion member, the substantially flat head comprising a first single-layer head portion being part of the first L-shaped segment and a second single-layer head portion being part of the second L-shaped segment, the first single-layer head portion having a first inward extension, and the second single-layer head portion having a second inward extension;
    a double-layer neck portion having an opening comprising a funnel configuration, and extending from the substantially flat head in a direction substantially perpendicular to said substantially flat head; and
    a double-layer leg portion extending from the double-layer neck portion in a direction substantially parallel to said double-layer neck portion.

2. An L-shaped segment as defined in claim 1, wherein at least one of the first L-shaped segment and the second L-shaped segment comprises at least one outwardly disposed barb.

3. An L-shaped segment as defined in claim 1, wherein the substantially flat head is fully single-layered, at least after insertion of the expanding member through the engageable hole.

4. An L-shaped segment as defined in claim 2, wherein the substantially flat head is fully single-layered, at least after insertion of the expanding member through the engageable hole.

5. An L-shaped segment as defined in claim 1, further comprising an additional engagement section at a part of the fastener under the head.

6. An L-shaped segment as defined in claim 2, further comprising an additional engagement section at a part of the fastener under the head.

7. An L-shaped segment as defined in claim 4, further comprising an additional engagement section at a part of the fastener under the head.

8. An L-shaped segment as defined in claim 1, wherein at least one of the first inward extension and the second inward extension is adequately wide to overlap the other.

9. An L-shaped segment as defined in claim 2, wherein at least one of the first inward extension and the second inward extension is adequately wide to overlap the other.

10. An L-shaped segment as defined in claim 1, wherein the hole at the head of the fastener has a shape selected from a group comprising substantially round and substantially oblong.

11. A sheet-metal fastener comprising an assembly of a first L-shaped segment and a second L-shaped segment combined together to form a T-shaped structure the T-shaped structure comprising
    a substantially flat head, the substantially flat head having a hole engageable to an expansion member, the substantially flat head comprising a first single-layer head portion being part of the first L-shaped segment and a second single-layer head portion being part of the second L-shaped segment, the first single-layer head portion having a first inward extension, and the second single-layer head portion having a second inward extension;
    a double-layer neck portion having an opening comprising a funnel configuration, and extending from the substantially flat head in a direction substantially perpendicular to said substantially flat head; and
    a double-layer leg portion extending from the double-layer neck portion in a direction substantially parallel to said double-layer neck portion.

12. A sheet-metal fastener as defined in claim 11, wherein at least one of the first L-shaped segment and the second L-shaped segment comprises at least one outwardly disposed barb.

13. A sheet-metal fastener as defined in claim 11, wherein the substantially flat head is fully single-layered, at least after insertion of the expanding member through the engageable hole.

14. A sheet-metal fastener as defined in claim 12, wherein the substantially flat head is fully single-layered, at least after insertion of the expanding member through the engageable hole.

15. A sheet-metal fastener as defined in claim 11, further comprising an additional engagement section at a part of the fastener under the head.

16. A sheet-metal fastener as defined in claim 12, further comprising an additional engagement section at a part of the fastener under the head.

17. A sheet-metal fastener as defined in claim 14, further comprising an additional engagement section at a part of the fastener under the head.

18. A sheet-metal fastener as defined in claim 11, wherein at least one of the first inward extension and the second inward extension is adequately wide to overlap the other.

19. A sheet-metal fastener as defined in claim 12, wherein at least one of the first inward extension and the second inward extension is adequately wide to overlap the other.

20. A sheet-metal fastener as defined in claim 11, wherein the hole at the head of the fastener has a shape selected from a group comprising substantially round and substantially oblong.

21. A vehicle as defined in claim 11, wherein at least one of the first L-shaped segment and the second L-shaped segment comprises at least one outwardly disposed barb.

22. A vehicle as defined in claim 21, wherein the substantially flat head is fully single-layered, at least after insertion of the expanding member through the engageable hole.

23. A vehicle as defined in claim 22, wherein the sheet-metal fastener further comprises an additional engagement section at a part of the fastener under the head.

24. A vehicle as defined in claim 21, wherein the sheet-metal fastener further comprises an additional engagement section at a part of the fastener under the head.

25. A vehicle as defined in claim 21, wherein at least one of the first inward extension and the second inward extension is adequately wide to overlap the other.

26. A fastener as defined in claim 11, further comprising an elastic body integrally molded at least in the vicinity of the head and at least under the head of said fastener.

27. A fastener as defined in claim 11, wherein the first L-shaped segment and the second L-shaped segment are connected together by a secondary connection.

28. A fastener as defined in claim 27, wherein the secondary connection comprises a tab.

29. A fastener as defined in claim 28, wherein the tab is integral part of both the first L-shaped segment and the second L-shaped segment.

30. A fastener as defined in claim 27, wherein the secondary connection is a temporary frictional connection.

31. A fastener as defined in claim 11, wherein the first L-shaped segment is physically connected to the second L-shaped segment.

32. A fastener as defined in claim 31, wherein the first L-shaped segment is connected to the second L-shaped segment by a side tab.

33. A fastener as defined in claim 32, wherein the side tab is integral part of one of the first L-shaped segment and the second L-shaped segment.

34. A fastener as defined in claim 32, wherein the side tab is integral part of both the first L-shaped segment and the second L-shaped segment.

35. A fastener as defined in claim 31, wherein the first L-shaped segment is connected to the second L-shaped segment by frictional engagement.

36. A fastener as defined in claim 31, wherein the first L-shaped segment is connected to the second L-shaped segment by a connection which is breakable upon expansion of the legs.

37. A vehicle comprising two elements connected with a sheet-metal fastener, the vehicle comprising an assembly of a first L-shaped segment and a second L-shaped segment combined together to form a T-shaped structure the T-shaped structure comprising a substantially flat head, the substantially flat head having a hole engageable to an expansion member, the substantially flat head comprising a first single-layer head portion being part of the first L-shaped segment and a second single-layer head portion being part of the second L-shaped segment, the first single-layer head portion having a first inward extension, and the second single-layer head portion having a second inward extension;

a double-layer neck portion having an opening comprising a funnel configuration, and extending from the substantially flat head in a direction substantially perpendicular to said substantially flat head; and a double-layer leg portion extending from the double-layer neck portion in a direction substantially parallel to said double-layer neck portion.

38. A vehicle as defined in claim 37, wherein the substantially flat head is fully single-layered, at least after insertion of the expanding member through the engageable hole.

39. A vehicle as defined in claim 37, wherein the sheet-metal fastener further comprises an additional engagement section at a part of the fastener under the head.

40. A vehicle as defined in claim 37, wherein at least one of the first inward extension and the second inward extension is adequately wide to overlap the other.

41. A vehicle as defined in claim 37, wherein the hole at the head of the fastener has a shape selected from a group comprising substantially round and substantially oblong.

42. A vehicle as defined in claim 37, wherein the fastener further comprises an elastic body integrally molded at least in the vicinity of the head and at least under the head of said fastener.

43. A fastener as defined in claim 31, further comprising an elastic body integrally molded at least in the vicinity of the head and at least under the head of said fastener.

44. A vehicle comprising two elements connected with a sheet-metal fastener, the vehicle comprising an assembly of a first L-shaped segment and a second L-shaped segment physically connected together to form a T-shaped structure the T-shaped structure comprising a substantially flat head, the substantially flat head having a hole engageable to an expansion member, the substantially flat head comprising a first single-layer head portion being part of the first L-shaped segment and a second single-layer head portion being part of the second L-shaped segment, the first single-layer head portion having a first inward extension, and the second single-layer head portion having a second inward extension;

a double-layer neck portion having an opening comprising a funnel configuration, and extending from the substantially flat head in a direction substantially perpendicular to said substantially flat head; and a double-layer leg portion extending from the double-layer neck portion in a direction substantially parallel to said double-layer neck portion.

45. A vehicle as defined in claim 44, wherein the first L-shaped segment is connected to the second L-shaped segment by a side tab.

46. A vehicle as defined in claim 45, wherein the side tab is integral part of one of the first L-shaped segment and the second L-shaped segment.

47. A vehicle as defined in claim 45, wherein the side tab is integral part of both the first L-shaped segment and the second L-shaped segment.

48. A vehicle as defined in claim 44, wherein the first L-shaped segment is connected to the second L-shaped segment by frictional engagement.

49. A vehicle as defined in claim 44, wherein the first L-shaped segment is connected to the second L-shaped segment by a connection which is breakable upon expansion of the legs.

50. A vehicle as defined in claim 44, wherein the fastener further comprises an elastic body integrally molded at least in the vicinity of the head and at least under the head of said fastener.

51. A vehicle as defined in claim 49, wherein the first L-shaped segment and the second L-shaped segment are connected together by a secondary connection.

52. A vehicle as defined in claim 51, wherein the secondary connection comprises a tab.

53. A fastener as defined in claim 52, wherein the tab is integral part of both the first L-shaped segment and the second L-shaped segment.

54. A fastener as defined in claim 51, wherein the secondary connection is a temporary frictional connection.

* * * * *